United States Patent [19]
Topolski

[11] 3,967,828
[45] July 6, 1976

[54] RECORD SELECTOR MECHANISM FOR A PHONOGRAPH SYSTEM

[75] Inventor: Alvin S. Topolski, Tonawanda, N.Y.

[73] Assignee: The Wurlitzer Company, Chicago, Ill.

[22] Filed: Mar. 3, 1975

[21] Appl. No.: 554,584

[52] U.S. Cl. ............................ 274/10 D; 274/39 A
[51] Int. Cl.² ..................... G11B 17/22; G11B 3/60
[58] Field of Search ............... 274/10 C, 10 D, 9 R, 274/9 B, 39 R, 39 A

[56] References Cited
UNITED STATES PATENTS

| | | | |
|---|---|---|---|
| 2,690,913 | 10/1954 | Rabinow | 274/10 C |
| 2,839,305 | 6/1958 | Andres | 274/10 D |
| 2,952,463 | 9/1960 | Vanderzee et al. | 274/10 D |
| 2,992,006 | 7/1961 | Foufounis | 274/10 C |
| 3,480,282 | 11/1969 | Mindell et al. | 274/39 R |
| 3,561,768 | 2/1971 | Castagna | 274/9 B |

Primary Examiner—Richard E. Aegerter
Assistant Examiner—Steven L. Stephan
Attorney, Agent, or Firm—Olson, Trexler, Wolters, Bushnell & Fosse, Ltd.

[57] ABSTRACT

The embodiment of the invention disclosed herein is directed to a record selector mechanism which includes a plurality of spaced-apart records to be individually selected from their storage position and transported to a playing position. The record selector mechanism has an arcuately movable playing station which scans the plurality of positions occupied by the records located in a storage position. The system also includes means for removing the record from the storage position and inserting it into rotating means for playing the record while the playing station remains in registry with the storage position. The rotating means includes diametrically opposed friction surfaces which are slightly angled relative to one another and include means to effect self-centering of the record. A slide pointer is mounted for arcuate movement at the exterior of a housing and positioned in registry with one of a plurality of locations for selecting a desired record associated with that location and identified by indicia means at that location.

6 Claims, 4 Drawing Figures

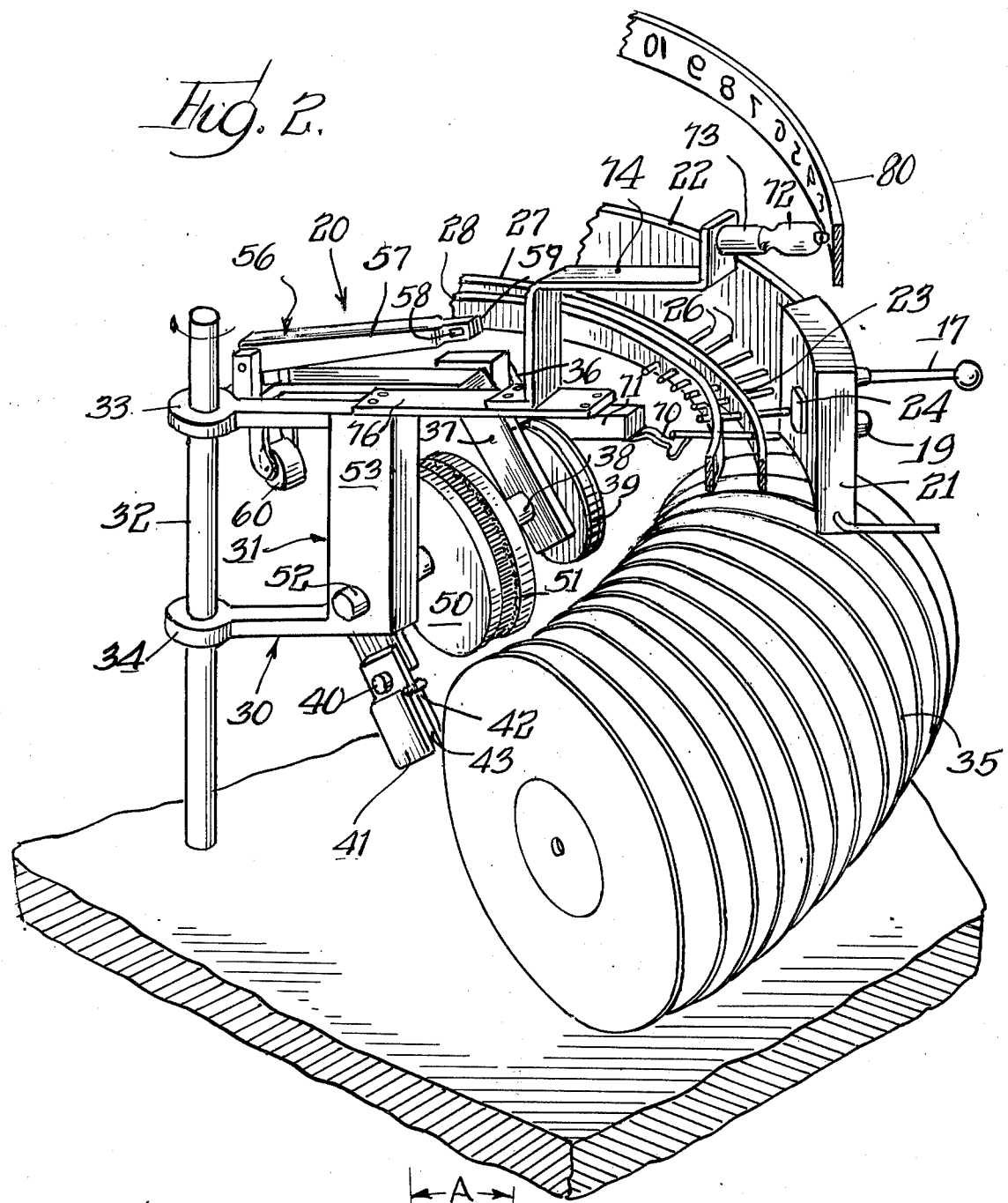
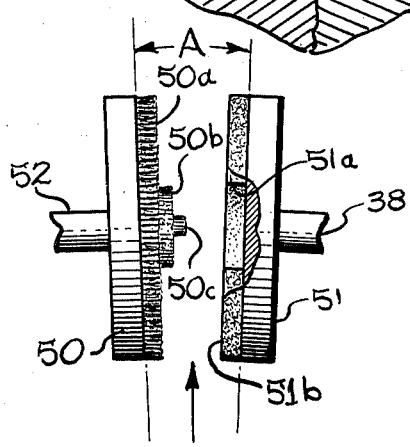

RECORD SELECTOR MECHANISM FOR A PHONOGRAPH SYSTEM

BACKGROUND OF THE INVENTION

This invention relates generally to phonograph systems, and more particularly, to juke box type phonograph systems wherein a plurality of records are individually selected and played by actuation of coin-operated means. Specifically, the invention is directed to a low cost, low maintenance phonograph system wherein selected ones of a plurality of records are played.

Heretofore, phonograph systems of the juke box type have included a large quantity of records, sometimes in the order of 100 or more, which are mounted in a toroidal tray or magazine. The toroidal tray or magazine may be rotatable about a central axis to place a desired record at a playing station, or, in the alternative, means may be provided for removing a record from the toroidal tray and moving the removed record about the central axis of the toroidal tray to place it in registry with a playing station. In either case, the complex mechanism required for rotating the toroidal tray or moving the record removal mechanism requires highly skilled and trained personnel for maintaining such equipment. Furthermore, such mechanical mechanisms are relatively expensive in that they require relatively high tolerance to be maintained when fabricating the components used as well as requiring a substantial number of discrete components to be assembled. Once again, the manufacture and assembly of such mechanisms require the attention of skilled personnel.

Furthermore, prior art types of phonograph systems of the juke box type include complicated selector mechanisms. Generally, this type of juke box has a plurality of push buttons divided into two groups, one group being identified by the letters of the alphabet and a second group being identified by discrete numerals. As is well known, a selection is made by actuating certain ones of the buttons in each group. This requires complicated selector mechanisms, which may be either mechanical or electronic in nature. Here again, the skill required to maintain this type of prior art selector mechanism is substantial, to say the least.

In many foreign countries, where technical expertise is at a premium, the manpower required to install, service and maintain juke box type of phonograph systems is at a minimum, and in some cases, nonexistent. Therefore, present-day sophisticated juke box systems are not practical for use in such underdeveloped foreign countries.

SUMMARY OF THE INVENTION

Accordingly, it is an object of this invention to provide a new and improved phonograph system of the juke box type which has all of the advantages of present sophisticated juke box systems but which has a minimum of moving parts, and hence is simple to maintain by those having a minimal amount of technical skill.

Another object of this invention is to provide a new and improved phonograph system of the juke box type which is small and light in weight to facilitate shipping to foreign countries at minimum cost.

Another object of this invention is to provide a new and improved phonograph system wherein a selected one of the plurality of records is removed from a storage station into a movable playing station, thereby eliminating the need for complex transfer mechanisms to transport the record from its storage position to a playing position which is not in registry therewith.

Yet another object of this invention is to provide a new and improved phonograph system which is simple and efficient to manufacture without necessitating the requirement for maintaining accurate tolerances of parts for efficient and reliable operation.

Still another object of this invention is to provide a new and improved record-centering mechanism which eliminates the need of placing a record on a spindle.

A feature of this invention is the utilization of a pair of diametrically opposed friction surfaces which are slightly angled relative to one another and wherein one of the friction surfaces includes a sculptured fibrous face which may be configurated to fit the center hole of both 33 and 45 rpm records. The angular displacement of the diametrically opposed faces causes the record to move toward the center and ultimately cause the sculptured center portion to engage the aperture in the record.

Briefly, the phonograph system of this invention includes a stack of records, preferably 20 in number, or thereabouts. The records are positioned in a storage unit preferably curved through an angular segment which forms part of a toroidal magazine. The turntable of the phonograph system is mounted to a pivotal concentric which has its center line coincident with the center of the imaginary toroid forming the arc segment of stored records. The turntable assembly scans back and forth over the fixed record storage magazine and, upon reaching a selected point, energizes record removal means to remove the record from the storage tray and place it on the turntable for playing while the turntable remains at the selected position.

The turntable of the phonograph of this invention includes two, non-concentric spindles or plates approximately 3½ inches in diameter and spaced approximately ⅛ inch apart. One plate is provided with a layer of flocked material affixed thereto. The flocked material preferably is sculptured to form a flexible pilot to receive the aperture of a record. This material is sufficiently flexible so as not to damage the record as it slides thereacross, but stiff enough to drive a record in a translational manner to the center of the turntable spindle. The turntable assembly is provided with means for automatic centering of the record even if the record is off-center by as much as 1½ inches to 2 inches. This feature eliminates the need for critical and exact mechanisms required in prior art record transfer units. It also eliminates the need for clamping mechanisms typically used in vertical turntables. The turntable structure of this invention allows the use of pinch-type transfer arms to transfer the record from its storage position to its playing position, and because of the clamping disks at the center of the record, even the worst type of warped records can be used.

The mechanical selector mechanism is manually operated by the user upon selecting the desired record. This eliminates complex indexing and driving means heretofore utilized in automatic phonograph systems such as juke boxes or the like. The record player includes a light bulb on the turntable, which light bulb is placed in registry with a number and/or indicia to indicate the record now being played. Furthermore, the phonograph system may include a playmeter if desired.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 2 is a fragmentary perspective view of the phonograph apparatus housed within the unit of FIG. 1;

FIG. 4 illustrates the cross-sectional details of the sculptured configuration of the diametrically opposed frictional disks.

DETAILED DESCRIPTION OF THE ILLUSTRATED EMBODIMENT

Figure 1:
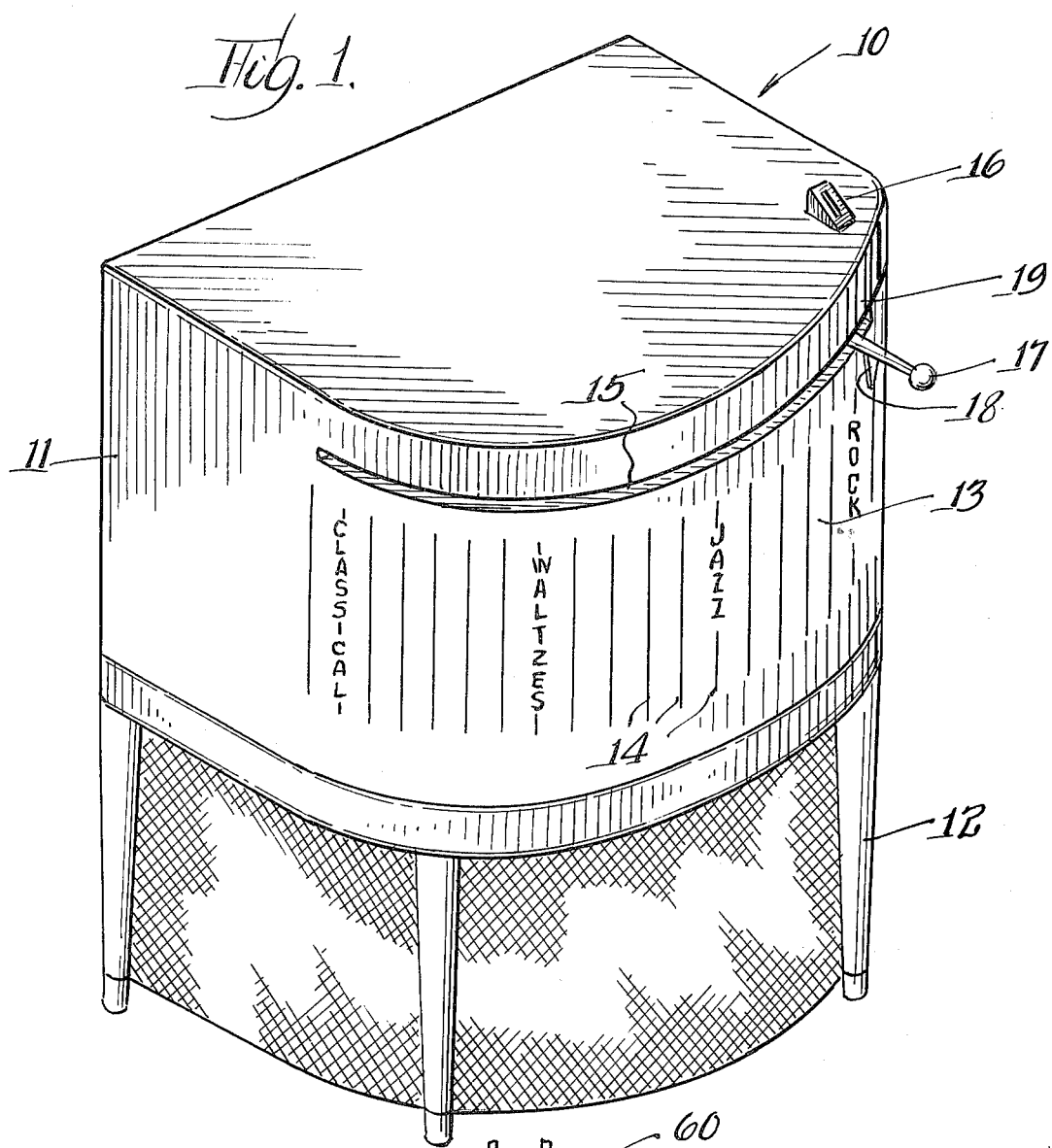
FIG. 1 is a perspective view of a phonograph system constructed in accordance with the principles of this invention and wherein a novel turntable arrangement is utilized.

Referring now to FIG. 1, there is seen a diagrammatic representation of a juke box housing structure designated generally by reference numeral 10 and wherein the phonograph system of this invention can be utilized. The housing 10 includes an upper cabinet portion 11 for containing the mechanical components of the phonograph system and a lower cabinet portion 12 wherein the audio amplifier and speaker systems may be contained. The lower cabinet portion 12 may also include the power supply and necessary electrical connections for interconnecting the various modular components of the phonograph system.

The housing 10, in the illustrated embodiment, includes a curved front wall 13 formed on the upper portion 11. The curved front wall has a plurality of horizontally spaced-apart and vertically oriented indicia elements designated generally by reference numeral 14. While the indicia is here illustrated as being vertically oriented, it will be understood that horizontal indicia may be provided with lead lines extending from each indicia to a corresponding spot along an arcuately formed slot 15 which forms part of the mechanical selector mechanism of this invention. The indicia 14 corresponds to information of the record selections available in the juke box. For example, the number of selections available in the illustrated embodiment may be in the order of about 20 records, thereby providing 40 selections, 2 selections per record, as is well-known in the art. Therefore, the number of indicia 14 across the arcuate surface may be 40.

The juke box housing 10 includes a coin receptacle means 16 into which coins are inserted for energizing the mechanism within the juke box for playing the same. The coin mechanism operable within the juke box may be of any suitable type well known in the art. The coin-operated mechanism may be either electrical, electro-mechanical or mechanical as desired. Also associated with the coin-actuated mechanism may be credit accumulating means for enabling bonus credits to be accumulated during insertion of coins of either small or large denominations. For example, a single coin of a given monetary value may provide a single selection while a coin of greater monetary value may provide three or more selections. The credit accumulator may include means for accumulating coin credits of lower denomination coins and adding these credits to accumulate a total credit of a higher value coin.

Most advantageously, the juke box structure 10 includes a slide member 17 horizontally movable along an arcuate path as defined by the slot 15. The slide member 17 is movable immediately adjacent the horizontally spaced-apart vertically oriented indicia elements 14. The slide element 17 also includes a pointer 18 extending downwardly therefrom to be placed in arcuate registry with the desired indicia unit 14. The selector arrangement may include a release element 19, which, when depressed, enables the slide member to be moved horizontally through the arcuate slot 15 so that the pointer 18 can be placed next to the desired selection.

Referring now to FIG. 2, there is seen a unique phonograph system constructed in accordance with the principles of this invention and designated generally by reference numeral 20. The phonograph system 20 is readily adapted for mounting within the housing of FIG. 1. The selector mechanism includes the slide rod 17 mounted to a support housing 21 and protruding through the front wall of the cabinet 10, as shown in FIG. 1. The selector rod 17 and housing 21 may ride on arcuate rods 22 and 23 during sliding motion thereof. The selector housing 21 may also be provided with rollers and captured between panels or other rail elements if desired. The selector button 19 is coupled to a movable push-rod element 24 located at the rear of the selector housing 21. The push-rod element 24 engages a selected one of a plurality of stop elements 26 for extending the stop element from its non-selected position, extending radially outwardly, to its selected position, extending radially inwardly. The stop elements 26 are here illustrated as rods extending between a pair of arcuately shaped strips 27 and 28.

The phonograph system has a plurality of records 35 oriented in a segment of a toroid and which toroid has its center extending substantially along the center of the shaft 32. The records are angularly spaced-apart substantially equally from one another so that the playing apparatus 30 can move in uniform increments from one playing station to another playing station. The record playing station is designated generally by reference numeral 30 and includes a support housing 31 pivotally secured to a vertical shaft 32 by means of a pair of spaced-apart boss elements 33 and 34. The support 31 includes a pair of spaced-apart arms 36 and 37 to receive a rotating shaft 38 therebetween. The shaft 38 is coupled to a drive pulley 39 which, in turn, receives a belt, not shown, for coupling to suitable electric drive motor means for rotating the shaft 38 at record playing speed.

Also mounted on the support frame 31 is a record transport unit 40 which, in the illustrated embodiment, is formed by a pinch-type arm arrangement having pinching fingers 41 and 42 with pad elements 43 and 44, respectively, associated therewith. The transfer unit 40 is moved into position adjacent the desired records, and actuated so as to cause the pinching fingers 41 and 42 to clamp the record firmly. The arm is then rotated through an arcuate motion so as to remove the record from the toroidal segment tray and place it in a playing position. Most advantageously, the playing position of the illustrated embodiment includes a pair of diametrically opposed spaced-apart friction wheels 50 and 51. The wheel 51 is the driven wheel and is coupled to the shaft 38 for rotation therewith. On the other hand, wheel 50 is an idler wheel and is rotatably secured to the stub shaft 52 rotatably mounted to a web portion 53 of the support 31. The record is then swung into position by the pinch arm 40 and placed between the fibrous pad elements of the rotating disks 50 and 51.

Also mounted on the support member 31 is a transducer element designated generally by reference numeral 56 and includes a tone arm 57 with a pair of diametrically opposed stylus elements 58 and 59. Means is provided to urge the tone arm 57 either to the left or to the right, depending on which side of the record is to be played. Upon insertion of the selected record between the friction disks 50 and 51, the record becomes nearly centered with the axis of the shaft 38 by a roller element 60 positioned radially outwardly of the center of the disks a distance equal to about ⅛ inch plus the radius of the largest record anticipated. Thereafter, one to one and a half revolutions of the record will ultimately cause any high spots of the peripheral edge to engage the roller 60 and push the record between the friction disks so that the center of the record is now within ¾ inch to the center of shaft 38 as the periphery of the record continues to move adjacent the roller 60. The diametrically opposed friction surfaces or disks 50 and 51 draw the record away from the roller 60 and center the record within a few revolutions. This will be described in more detail hereinbelow with regard to FIGS. 3 and 4.

The memory and scanning arrangement of the present invention is substantially simplified in that push-rods 26 protrude radially inwardly to engage a sensing arm 70 of a switch unit 71. The entire playing station 30 rotates about the shaft 32 and, when in the selected position, is stopped by actuation of the switching member 71. Suitable circuitry is also provided to effect movement of the gripping arm 40 to place the desired record between the friction disks 50 and 51. Means may be provided to push the selected push-rod back into its neutral position after the selection begins to play so that the selection playing can again be selected at a subsequent time. Also, it will be noted that playing of the records is from one selected push-rod to the next, thereby substantially simplifying the selector mechanism.

In accordance with the principles of this invention, a record-now-playing indicator light 72 is mounted to a socket 73 which, in turn, is secured to a bracket 74 for rotation with the support member 31. The bracket 74 is mounted to an extension arm 76. The light 72 is placed in registry with an indicia-bearing strip 80 having numbers formed therealong corresponding to the selection-now-being-played. Therefore, the user can determine if his selection is being played by merely looking at the number which is illuminated.

Figure 3:
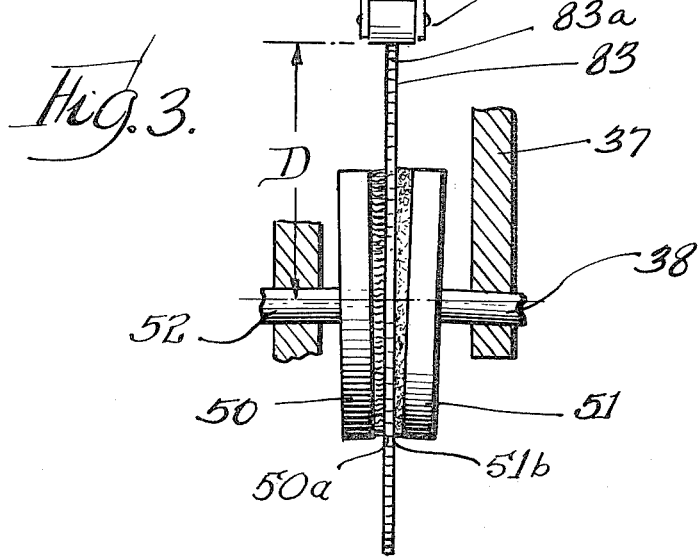
FIG. 3 is an endview of the pressure pads and centering arm utilized to hold and center the record automatically in accordance with this invention.

Referring now to FIGS. 3 and 4, the details of the self-centering feature of the present invention are clearly illustrated. The friction disks or wheels 50 and 51 are rotatable about independent axes which are angled relative to one another in the order of about 0°–7°, more or less. The angular displacement between the axes is indicated by the letter A of FIG. 4. The friction disk 50 has a sculptured surface 50a and includes a first spindle portion 50b to receive records having large apertures such as 45 rpm records and a second concentrically located hub portion 50c to receive 33 and 78 rpm records. The friction disk 51 preferably has the center portion thereof recessed as indicated by reference numeral 51a, this recess being circular in configuration to receive the hub portions 50b and 50c. A record 83 is shown in the playing position in FIG. 3 and is captured between the friction disks 50 and 51 and rotated therewith so that the peripheral edge 83a obtains a uniform distance from the roller 60 when the record is centered. The roller 60 is a distance D from the axes passing through the shafts 52 and 38, which distance is greater than the radius of the record by approximately ⅛ inch or so. Therefore, the roller 60 provides a course adjustment for centering of the record while the sculptured surfaces of the disks ultimately center the record during rotation. In actual operation, the record is centered to within ¾ inch as it is inserted between the friction disks. The interaction of the face materials of the disks 50 and 51 upon the record and upon the record hole automatically drive the record to its correct center position and displace the peripheral edge of the record away from the roller 60. Therefore, the self-centering arrangement of this invention provides means for playing records which are not uniform in diameter, this being a substantial improvement over existing record players.

In the illustrated embodiment, the disk 50 has the sculptured surface 50a thereof formed of fibrous material such as "Fiber-tran" better known as ASTRO-TURF, while the surface 51b of the disk 50 is formed of a resilient material such as foam rubber or the like. However, it will be understood that other materials on the disks may be used without departing from the spirit and scope of this invention.

Another novel feature of the present invention is that the tone arm control mechanism 20 does not require a retracting mechanism. As a new record is inserted between the disks 50 and 51 by the arm 40 the edge of the record engages the tone arm and pushes it to a retracted position. Therefore, no retracting mechanism is needed to accomplish this function. Once the tone arm is reset to its retracted position, a reversible motor drives the tone arm against an inclined plane to set its touch-down position. Therefore, the tone arm assembly is substantially simplified and provides means for easy maintenance and long-term durability.

What has been described is a simple and efficient phonograph system which lends itself for use in inexpensive juke box apparatus. While a single specific embodiment of the invention has been illustrated herein, it will be understood that variations and modifications may be effected without departing from the spirit and scope of the novel concepts as set forth in the following claims.

The invention is claimed as follows:

1. In a phonograph system the combination comprising: first and second spaced-apart resilient disk means having opposed frictional surfaces for engaging opposite faces of a disk type record therebetween, said frictional surfaces engaging the faces of said record and rotationally driving said record prior to centering thereof, drive means engageable with at least one of said spaced-apart disk means for driving said disk means and said record placed therebetween at playing speed, coarse means for placing the center of said record within close proximity of said spaced-apart disk means, dynamic self-centering means formed on said disk means and engageable with the faces of a record to effect self-centering of said record upon rotation of said disk means and said record, transducer means engageable with said record for reproducing the information thereon, and reproducing means for producing an audio output of the information on said record.

2. In the phonograph system as set forth in claim 1 wherein said coarse alignment means includes means for engaging the peripheral edge of said record before centering thereof as it rotates with said first and second disk means for urging radial components of said peripheral edge which extend a distance greater than the radius of said record inwardly toward the center of said disk means, said coarse alignment means being spaced from the central axis of said disk means a distance greater than the radius of the maximum radius record to be inserted therebetween and played.

3. In the phonograph system as set forth in claim 1 wherein said one of said disk means is provided with resilient rubber-like material and the other of said disks is provided with resilient fibrous material.

4. In the phonograph system as set forth in claim 3 wherein the resilient fibrous material of said other disk means is sculptured to form a central hub to fit into the center aperture of said record.

5. In the phonograph system as set forth in claim 4 wherein said disk means rotate about independent axes which are angled relative to one another in the order of about 0.5 to 10 degrees.

6. In the phonograph system as set forth in claim 1 further including means for inserting said record between said disks by moving the record from a storage position to a playing position between said disk means.

* * * * *